US012717116B2

(12) United States Patent
Niu et al.

(10) Patent No.: US 12,717,116 B2
(45) Date of Patent: Aug. 25, 2026

(54) LENS MODULE AND ELECTRONIC DEVICE

(71) Applicant: Huawei Technologies Co., Ltd., Shenzhen (CN)

(72) Inventors: Yajun Niu, Shanghai (CN); Haishui Ye, Shanghai (CN); Chiachun Chang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1137 days.

(21) Appl. No.: 17/761,404

(22) PCT Filed: Aug. 3, 2020

(86) PCT No.: PCT/CN2020/106645
§ 371 (c)(1),
(2) Date: Mar. 17, 2022

(87) PCT Pub. No.: WO2021/052044
PCT Pub. Date: Mar. 25, 2021

(65) Prior Publication Data

US 2022/0365323 A1 Nov. 17, 2022

(30) Foreign Application Priority Data

Sep. 18, 2019 (CN) ......................... 201910883663.5

(51) Int. Cl.
*G02B 13/00* (2006.01)
*G02B 3/14* (2006.01)

(52) U.S. Cl.
CPC ........... *G02B 13/0045* (2013.01); *G02B 3/14* (2013.01); *G02B 13/0075* (2013.01)

(58) Field of Classification Search
CPC .. G02B 13/0045; G02B 3/14; G02B 13/0075; G02B 13/009; G02B 13/18;
(Continued)

(56) References Cited

U.S. PATENT DOCUMENTS

| | | | | |
|---|---|---|---|---|
| 5,808,799 | A | 9/1998 | Klocek | |
| 2008/0239503 | A1* | 10/2008 | Conradi | G03F 7/70825 359/666 |

(Continued)

FOREIGN PATENT DOCUMENTS

| | | | |
|---|---|---|---|
| CN | 1914522 | A | 2/2007 |
| CN | 101738709 | A | 6/2010 |

(Continued)

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007).*

(Continued)

*Primary Examiner* — William R Alexander
*Assistant Examiner* — Mackenzi Bourquine
(74) *Attorney, Agent, or Firm* — Slater Matsil, LLP

(57) ABSTRACT

This application provides a lens module and an electronic device. The lens module includes an imaging lens group, a light filter, and an image sensor, the imaging lens group includes a plurality of lenses whose optical axes mutually overlap, the plurality of lenses include a liquid lens, a plastic lens, and a functional optical element, the functional optical element is a functional lens and/or a diffractive optical element, and a refractive index temperature coefficient β of the functional lens meets: −9×10-5≤β≤9×10-5.

20 Claims, 4 Drawing Sheets

100

(58) Field of Classification Search
CPC ........ G02B 13/0055; G02B 1/06; G02B 5/20; G02B 5/1814
USPC .................................................. 359/708, 665
See application file for complete search history.

(56) References Cited

U.S. PATENT DOCUMENTS

| | | | | |
|---|---|---|---|---|
| 2009/0091818 | A1 * | 4/2009 | Haddock | G02B 5/1895 359/654 |
| 2013/0114148 | A1 * | 5/2013 | Aschwanden | G02B 26/004 359/666 |
| 2019/0033604 | A1 * | 1/2019 | Chen | G02B 1/041 |

FOREIGN PATENT DOCUMENTS

| | | | |
|---|---|---|---|
| CN | 101910904 | A | 12/2010 |
| CN | 206757163 | U | 12/2017 |
| CN | 108490631 | A | 9/2018 |
| CN | 108508622 | A | 9/2018 |
| CN | 108732728 | A | 11/2018 |
| CN | 109031592 | A | 12/2018 |
| CN | 208351114 | U | 1/2019 |
| CN | 109324388 | A | 2/2019 |
| CN | 109870787 | A | 6/2019 |
| EP | 3518016 | A2 | 7/2019 |
| KR | 20090077576 | A | 7/2009 |
| KR | 20090103482 | A | 10/2009 |

OTHER PUBLICATIONS

Editorial Board of the Dictionary of Photography, “Dictionary of Photography”, Zhejiang Photography Publishing House, Dec. 2000, with an English Abstract and the related parts, 4 pages.

Gaorong, H. et al., “China’s Strategic Emerging Industries—New Materials (Special Glass)”, China Railway Publishing House, Jul. 2017, with an English Abstract and the related parts, 7 pages.

Lin, L. et al., “Applied Optics (5th Edition), Beijing Institute of Technology Press”, Jan. 2017, with an English Abstract and the related parts, 6 pages.

Yuxi, H., “Applied Optics (2nd edition)”, University of Science and Technology of China Press, Feb. 2009, with an English Abstract and the related parts, 6 pages.

* cited by examiner

LENS MODULE AND ELECTRONIC DEVICE

CROSS-REFERENCE TO RELATED APPLICATIONS

This application is a national stage of International Application No. PCT/CN2020/106645, filed on Aug. 3, 2020, which claims priority to Chinese Patent Application No. 201910883663.5, filed on Sep. 18, 2019. Both of the aforementioned applications are hereby incorporated by reference in their entireties.

TECHNICAL FIELD

This application relates to the field of terminal technologies, and specifically, to a lens module and an electronic device.

BACKGROUND

Currently, consumers have increasingly high requirements on photographing experience and photographing art effects of terminal devices such as a mobile phone, a tablet computer, and a digital camera. A liquid lens may be used to adjust a focal length of an optical system to implement features such as automatic focus, optical image stabilization, a macro distance, and telephoto. Application of the liquid lens to lenses of a terminal device has become a development trend.

A fixed-focal-length plastic lens group is usually used in a photographing module including a liquid lens. The fixed-focal-length plastic lens group is prone to expand due to heat emitting of a surrounding element, for example, a voice coil actuator or an image sensor. As a result, an effective focal length (Effective Focal Length) and a flange back length (Flange Back Length) of the lens group change with a temperature, causing a defocus phenomenon, referred to as a "temperature effect". How to resolve a temperature effect problem of an optical system including a liquid lens is a technical problem that is to be urgently resolved at present.

SUMMARY

To overcome the foregoing problem in the conventional technology, embodiments of this application provide a lens module and an electronic device, to resolve a temperature effect problem of a lens module including a liquid lens in the conventional technology.

According to a first aspect, an embodiment of this application provides a lens module. The lens module includes an imaging lens group, a light filter, and an image sensor, the light filter is disposed between the imaging lens group and the image sensor, the imaging lens group includes a plurality of lenses whose optical axes mutually overlap, the plurality of lenses include a liquid lens, a plastic lens, and a functional optical element, the functional optical element includes a functional lens and/or a diffractive optical element, and a refractive index temperature coefficient β of the functional lens meets: $-9\times10-5\leq\beta\leq9\times10-5$.

According to the lens module provided in this embodiment of this application, the functional optical element is disposed in the imaging lens group including the liquid lens, to resolve negative impact caused by a temperature effect. In this embodiment of this application, the functional lens and/or the diffractive optical element are/is selected as the functional optical element, and the refractive index temperature coefficient β of the functional lens meets: $-9\times10-5\leq\beta\leq9\times10-5$, so that temperature sensitivity of the entire imaging lens group can be reduced, and thermal stability of the imaging lens group can be improved, thereby effectively improving a temperature effect of the imaging lens group. In addition, because a microstructure of an optical diffraction grating in the diffractive optical element has relatively low temperature sensitivity, thermal stability of the lens module can be improved, thereby improving a temperature effect of the entire lens module.

Based on the first aspect, in a possible design, the liquid lens is any one of the first three lenses from an object side to an image side along the optical axis, to meet a miniaturization requirement of the lens module.

Based on the first aspect, in a possible design, from the object side to the image side along the optical axis, the liquid lens is the first lens, the functional optical element is the second lens and/or the third lens, and another lens in the plurality of lenses is the plastic lens. The functional optical element is disposed in the first half of the imaging lens group, so that the functional optical element is closer to the liquid lens than the plastic lens, to help improve a temperature effect by using the functional optical element, thereby improving stability of the lens module.

Based on the first aspect, in a possible design, the functional optical element includes the functional lens and the diffractive optical element, and from the object side to the image side along the optical axis, the functional lens is the second lens, and the diffractive optical element is the third lens. The two functional optical elements are applied to the lens module in combination, so that a comprehensive chromatic aberration can be corrected, and also a temperature effect can be improved, thereby dually ensuring imaging stability of the lens module.

Based on the first aspect, in a possible design, the functional optical element includes the functional lens, the functional lens is a glass lens, and the glass lens is a thinnest lens in the plurality of lenses, thereby helping reduce a total weight of the lens module.

Based on the first aspect, in a possible design, the functional optical element includes the functional lens, the functional lens is a glass lens, and the glass lens is a lens closest to a center of gravity of the imaging lens group, thereby improving stability of the lens module.

Based on the first aspect, in a possible design, the functional optical element includes the functional lens, and an object side surface and/or an image side surface of the functional lens are/is aspherical surfaces/an aspherical surface. An aspherical lens can improve an aberration, thereby improving imaging quality.

Based on the first aspect, in a possible design, the functional optical element includes the diffractive optical element, the diffractive optical element includes two lenses and an optical diffraction grating located between the two lenses, both the two lenses of the diffractive optical element are plastic lenses, and a thickness of the optical diffraction grating is 0 to 60 μm. Because a microstructure of the optical diffraction grating slightly changes with a temperature, a temperature effect of the entire lens module can be improved by using the diffractive optical element.

Based on the first aspect, in a possible design, the functional optical element includes the diffractive optical element, and an object side surface and/or an image side surface of the diffractive optical element are/is aspherical surfaces/an aspherical surface. An aspherical diffractive optical element can improve an aberration, thereby improving imaging quality.

Based on the first aspect, in a possible design, the functional optical element includes the functional lens, a dispersion coefficient Vd1 of the functional lens meets: $15 \leq Vd1 \leq 100$, and a dispersion coefficient Vd2 of the liquid lens meets: $Vd2 > 100$, thereby introducing fewer chromatic aberrations during automatic focus of the lens module.

According to a second aspect, an embodiment of this application provides an electronic device, including the foregoing lens module and a processor. The liquid lens includes an actuator and a thin film body in which liquid is encapsulated, and the processor is configured to control the actuator to drive the thin film body to change in surface shape, to implement focusing.

It should be understood that the foregoing general description and the following detailed description are merely examples, and cannot limit this application.

BRIEF DESCRIPTION OF THE DRAWINGS

To describe the technical solutions in the embodiments of this application more clearly, the following briefly describes the accompanying drawings for describing the embodiments. It is clear that the accompanying drawings in the following description show merely some embodiments of this application, and a person of ordinary skill in the art may still derive other drawings from these accompanying drawings without creative efforts. The accompanying drawings herein are incorporated into the specification and constitute a part of the specification, show embodiments conforming to this application, and are used together with the specification to explain a principle of this application.

DETAILED DESCRIPTION OF ILLUSTRATIVE EMBODIMENTS

Figure 1:
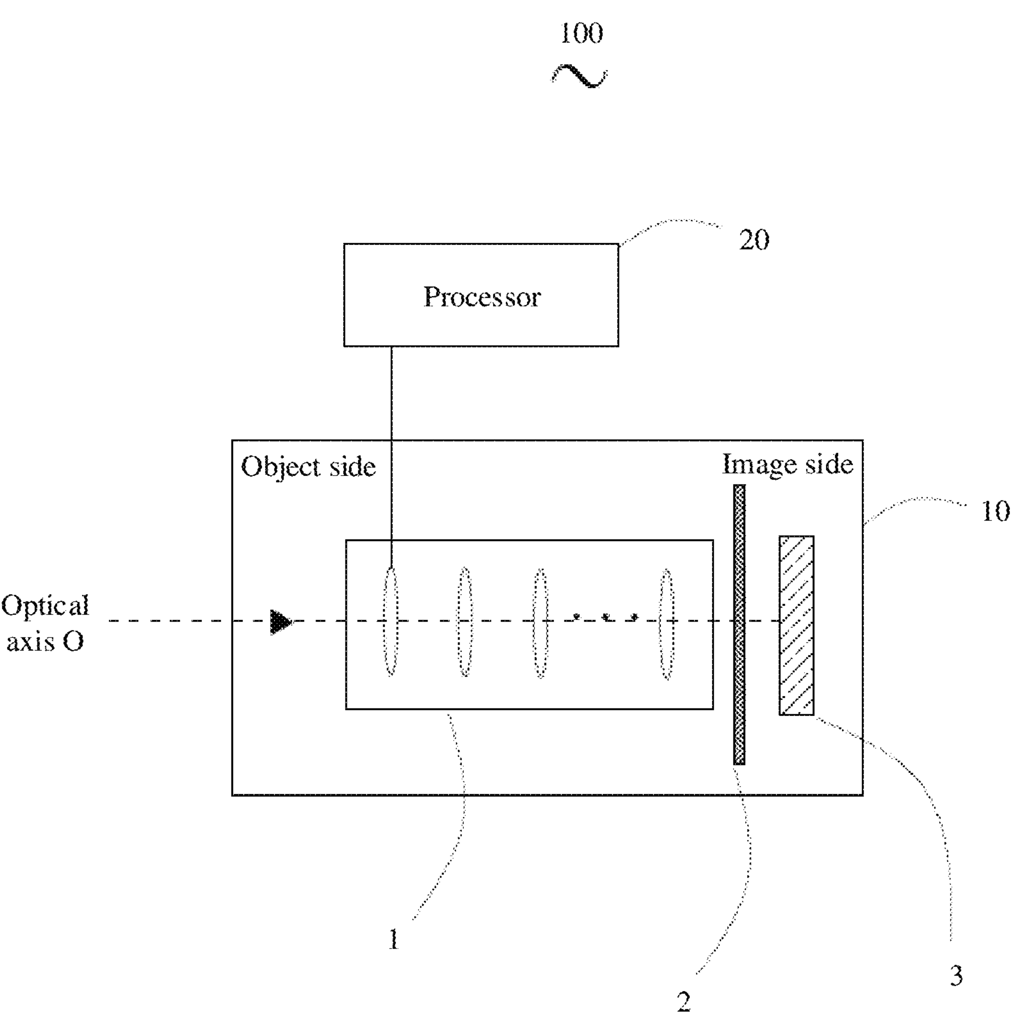
FIG. 1 is a schematic diagram of a structure of an electronic device according to an embodiment of this application.

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

The terms used in the embodiments of this application are merely for the purpose of illustrating specific embodiments, and are not intended to limit this application. The terms “a”, “the”, and “this” of singular forms used in the embodiments and the appended claims of this application are also intended to include plural forms, unless otherwise specified in the context clearly.

It should be understood that the term “and/or” in this specification describes only an association for describing associated objects and represents that three relationships may exist. For example, A and/or B may represent the following three cases: Only A exists, both A and B exist, and only B exists. In addition, a character “/” in this specification usually indicates that front and rear association objects are of an “or” relationship.

In the description of this application, unless otherwise clearly specified and limited, the terms “first” and “second” are used for only the purpose of description and cannot be understood as an indication or implication of relative importance. Unless otherwise specified or stated, the term “plurality of” means two or more. The term “connection”, “fastening”, or the like should be understood in a broad sense. For example, “connection” may be a fixed connection, or may be a detachable connection, an integral connection, or an electrical connection; or may be a direct connection, or may be an indirect connection performed by using an intermediate medium. A person of ordinary skill in the art may understand specific meanings of the foregoing terms in this application based on specific situations.

It should be noted that orientation words such as “above”, “below”, “left”, and “right” described in the embodiments of this application are described from angles shown in the accompanying drawings, and should not be construed as a limitation on the embodiments of this application. Moreover, in the context, it also should be understood that, when it is mentioned that one element is connected “above” or “below” another element, it can not only be directly connected “above” or “below” the another element, but also be indirectly connected “above” or “below” the another element by using an intermediate element.

The following briefly describes concepts in the embodiments.

Lens: The lens is a component that uses a lens refraction principle to enable light of a scene to pass through the lens to form a clear image on a focal plane.

Focal power: The focal power is equal to a difference between an image-side beam convergence degree and an object-side beam convergence degree, and represents a light deflection capability of an optical system.

Curvature radius: Curvature is a value used to represent a bending degree of a curve at a point. Larger curvature indicates a larger bending degree of the curve, and a reciprocal of the curvature is the curvature radius.

Aperture stop: A stop with a smallest incidence aperture angle is referred to as the aperture stop.

Liquid lens: The liquid lens is formed by wrapping liquid by using a thin film, and curvature of the liquid lens is changed by using a voice coil actuator to drive a thin film body to change in surface shape, to change a focal length.

Abbe number: An Abbe number of a lens is a dispersion coefficient of the lens, is a refractive index difference ratio of the lens at different wavelengths, and is used to represent a dispersion degree of the lens.

Coefficient of thermal expansion: The coefficient of thermal expansion is a physical quantity used to represent a thermal expansion degree of a lens, and may be represented by an average coefficient of linear expansion or an average coefficient of volume expansion.

Refractive index temperature coefficient: The refractive index temperature coefficient is used to represent a change that occurs in a refractive index of a lens due to a change of a unit temperature.

Object side surface: A surface that is of a lens and that is closest to a photographed object is the object side surface.

Image side surface: A surface that is of a lens and that is closest to an image sensor is the image side surface.

Temperature effect: The temperature effect means that when a temperature of a lens group sharply changes, an effective focal length (Effective Focal Length) and a flange back length (Flange Back Length) of the lens group change, causing a defocus phenomenon.

FIG. 1 is a schematic diagram of a structure of an electronic device 100. The electronic device 100 is, for example, a smartphone, a notebook computer, a desktop computer, a tablet computer, a personal digital assistant (Personal Digital Assistant, PDA), a wearable device, an augmented reality (Augmented Reality, AR) device, a virtual reality (Virtual Reality, VR) device, or a monitoring device. The electronic device 100 includes a lens module 10 and a processor 20.

An embodiment of this application further provides a lens module 10, including an imaging lens group 1, a light filter 2, and an image sensor 3.

The light filter 2 is disposed between the imaging lens group 1 and the image sensor 3. The light filter 2 can block a near infrared light wave (of 650 nm to 1500 nm) and an ultraviolet light wave (of less than about 450 nm). In an implementation, the light filter 2 is an infrared cut-off filter, and is configured to remove an infrared light wave through filtering.

The lens module 10 further includes a lens barrel, and the imaging lens group 1 is disposed in the lens barrel through fastening.

An imaging principle of the lens module 10 is as follows: Light enters the imaging lens group 1, and the imaging lens group 1 has a convergence imaging function for the light. An unnecessary light wave (for example, an infrared light wave) is removed from the light through filtering by using the light filter 2, and remaining light waves finally converge on the image sensor 3. The image sensor 3 may be a complementary metal-oxide-semiconductor (Complementary Metal-Oxide Semiconductor, CMOS) image sensor or a charge coupled device (Charge Coupled Device, CCD) image sensor. The image sensor 3 is mainly configured to perform optical-to-electrical conversion and analog/digital (Analog/Digital, A/D) conversion on an optical signal of light, and output image data.

The imaging lens group 1 is disposed between the image sensor 3 and a photographed object, to form an image (an optical signal) of the photographed object and reflect the image to the image sensor 3. In this embodiment, a side on which the photographed object is located is referred to as an object side, and a side on which the image sensor 3 is located is referred to as an image side.

In this solution, the imaging lens group 1 includes a liquid lens and a plastic lens.

The liquid lens is a zoom lens, and an actuator is pushed in an electronic control manner, to push liquid to squeeze a thin film to change in surface shape. Therefore, when the lens does not move or tilt, curvature of the liquid lens changes, so that a focal length of the entire imaging lens group changes, to implement features such as AF (Automatic Focus, automatic focus)/OIS (Optical image stabilization, optical image stabilization), a macro distance, and telephoto, thereby avoiding imaging deterioration caused by lens movement.

Figure 2:
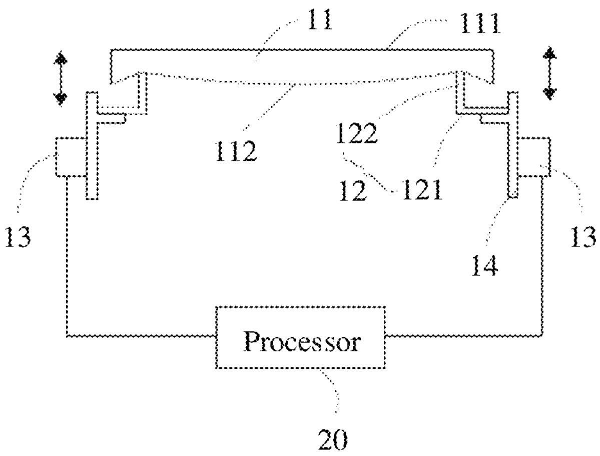
FIG. 2 is a schematic diagram of a structure of a liquid lens according to an embodiment of this application.

FIG. 2 is a schematic diagram of a structure of the liquid lens. As shown in FIG. 2, a liquid lens 10 includes a thin film body 11 that warps liquid, a pressing element 12, an actuator 13, and an actuator bracket 14. The thin film body 11 includes an object side surface 11 and an image side surface 112. The pressing element 12 is of a circular ring piece shape, and the pressing element 12 includes a first abutting portion 121 and a second abutting portion 122 connected to the first abutting portion 121. In this implementation, the first abutting portion 121 is a circular ring piece, and the second abutting portion 122 is formed through bending and extending from an inner edge of the first abutting portion 121. The first abutting portion 121 is connected to the actuator bracket 14, and the second abutting portion 122 is in contact with the image side surface 112 of the thin film body 11. The actuator bracket 14 is connected to the actuator 13 through fastening. In this implementation, the processor 20 is configured to push the actuator 13 to enable the thin film body 11 of the liquid lens to change in surface shape, thereby implementing focusing.

The processor 20 controls the actuator 13, to enable the actuator bracket 14 configured to fasten the actuator 13 to push the pressing element 12, and then change the image side surface 112 of the thin film body 11 by using the second abutting portion 122 of the pressing element 12, so that the image side surface 112 changes in surface shape. In this embodiment, the actuator 13 is a voice coil actuator, and there are four actuators 13. When the liquid lens 10 is zoomed, the four actuators 13 simultaneously work, generating a relatively large amount of heat. As a result, the entire lens module 100 is prone to thermally expand, causing a temperature effect.

Curvature of the thin film body 11 is changed by changing an acting force applied by the actuator 13. Acting forces applied by the four actuators 13 may be symmetrical and the same, or may be symmetric and different. When the acting forces are symmetrical and the same, curvature of the liquid lens can be evenly changed. When the acting forces applied by the four actuators are symmetric and different, curvature of the liquid lens is not evenly changed, and a light direction can be changed to enable a focal point to move at a specific angle. When the lens module 10 jitters, different acting forces may be applied to the image side surface of the liquid lens, to change a position of the focal point, and also avoid imaging deterioration caused by the jittering.

Optionally, a curvature change range of the liquid lens is infinity to 10, and infinity represents indefinitely large. In this embodiment, a shape of the liquid lens is not limited. It may be understood that a larger curvature change range of the liquid lens indicates a larger adjustable focal length range of the imaging lens group and a wider applicable range of the imaging lens group.

In another implementation, the liquid lens may be alternatively a multi-lens system including a plurality of liquid lenses.

The plastic lens is a lens made of a plastic material. The plastic material may be a polymer material, for example, polycarbonate (Polycarbonate, PC), PMMA (chemical name: polymethyl methacrylate, that is, polymethyl methacrylate, commonly referred to as acrylic), or cycloalkane. The plastic lens is light and has low costs, and therefore is a lens commonly used in current imaging lens groups. However, the plastic lens is also susceptible to thermal expansion to cause temperature drift. A coefficient of thermal expansion of the plastic lens is as close as possible to a coefficient of thermal expansion of the lens barrel.

To improve a temperature effect of the imaging lens group, in an embodiment of this application, the imaging lens group further includes a functional optical element, and the functional optical element, the liquid lens, and the plastic lens are aligned along an optical axis. The functional optical element is a functional lens and/or a diffractive optical element.

In this embodiment, a focal length of the liquid lens can be changed, and both the plastic lens and the functional optical element are fixed-focal-length optical elements.

A refractive index temperature coefficient β of the functional lens meets: $-9\times10-5\leq\beta\leq9\times10-5$. A material with a low refractive index temperature coefficient, for example, a glass material, is selected to make the functional lens. In another implementation, another material with a low refractive index temperature coefficient may be selected to make the functional lens. Therefore, temperature sensitivity of the entire imaging lens group is reduced, and thermal stability is improved, thereby effectively improving a temperature effect of the imaging lens group.

In a specific embodiment, there are one or two functional lenses. When two functional lenses are selected, materials of the two functional lenses may be the same or different.

In an implementation, the functional lens is a glass lens, is not sensitive to temperature, and further has features such as corrosion resistance and scratch resistance, so that thermal stability of the imaging lens group can be improved. Specifically, the glass lens may be, for example, an aspherical lens made by using a molding process, or may be a spherical lens made by using a spherical polishing process or molding process.

Optionally, a dispersion coefficient Vd1 of the functional lens meets: $15\leq Vd1\leq100$, and a comprehensive chromatic aberration of the imaging lens group may be corrected by properly allocating a dispersion coefficient of each lens in the imaging lens group.

The functional lens may be a spherical lens or an aspherical lens. Optionally, one of an object side surface and an image side surface of the functional lens is an aspherical surface. The aspherical surface can improve an aberration, thereby improving imaging quality.

Figure 3:
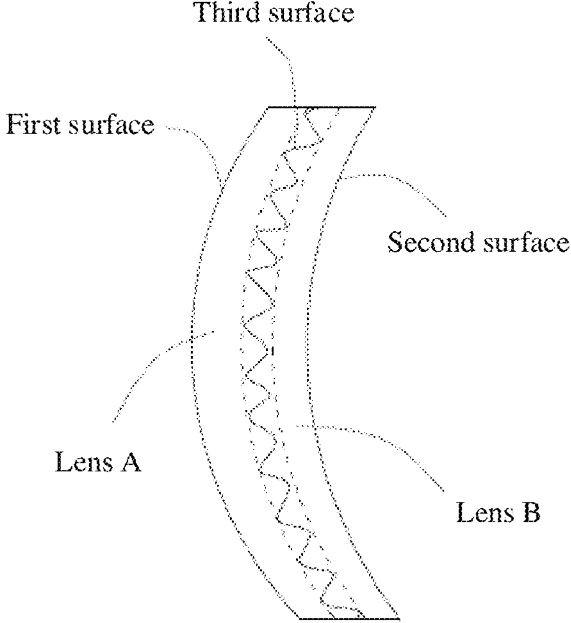
FIG. 3 is a schematic diagram of a structure of a diffractive optical element according to an embodiment of this application.

FIG. 3 is a schematic diagram of a structure of the diffractive optical element. As shown in FIG. 3, the diffractive optical element includes two layers of different optical materials (two lenses) and an optical diffraction grating located between the two layers.

Specifically, the diffractive optical element is formed by sandwiching the optical diffraction grating between the two lenses (A and B), and the diffractive optical element includes three surfaces: a first surface, a second surface, and a third surface. The first surface and the third surface are external surfaces of the diffractive optical element, and at least one of the first surface and the third surface is an aspherical surface, thereby helping balance an aberration, for example, a spherical aberration or astigmatism.

Optionally, the first surface is an object side surface and a convex surface, and the third surface is an image side surface and a concave surface. The second surface is a surface formed by the optical diffraction grating located inside the diffractive optical element, and the second surface may be a spherical surface, or may be an aspherical surface. In an implementation, the second surface is an aspherical surface.

Specifically, in the diffractive optical element, a thickness of the lens A is H1, and H1 meets: $0<H1<0.8$ mm; and a thickness of the lens B is H2, and H2 meets: $0<H2<0.8$ mm. The optical diffraction grating is disposed between the lens A and the lens B, and a grating height Gh of the optical diffraction grating meets: $0<Gh<60$ μm, that is, a thickness of the optical diffraction grating ranges from 0 to 60 μm. The diffractive optical element has a negative dispersion property, and therefore the diffractive optical element can be used to offset positive dispersion of a refractive element (for example, a plastic lens).

In an implementation, the two lenses (A and B) of the diffractive optical element are two plastic lenses. For example, a low-dispersion sulfur resin material is used for the lens A, a range condition of a refractive index N1 of the material is $1.62<N1<1.76$, and a range condition met by an Abbe number $Vd_A$ of the material used for the lens A is $30<Vd_A<80$.

A high-dispersion polycarbonate or modified alkane material is used for the lens B, a range condition of a refractive index N2 of the material is $1.55<N2<1.64$, and a range condition met by an Abbe number $Vd_B$ of the material used for the lens B is $10<Vd_B<50$. The diffractive optical element is made of lenses of plastic materials, so that a weight of the imaging lens group can be reduced and costs can be reduced.

At least one of the lens A and the lens B is an aspherical lens. Materials of the two plastic lenses may be different or the same.

It may be understood that the imaging lens group is disposed in the lens barrel of the lens module through fastening. After fastening, all lenses other than the liquid lens in the imaging lens group are prime lens. However, the plastic lens is prone to expand after being heated, and an effective focal length and a flange back length of the lens change after the plastic lens expands.

Because the thickness of the optical diffraction grating in the diffractive optical element is very small and ranges from 0 to 60 μm, a microstructure of the optical diffraction grating has relatively low temperature sensitivity, and a change that occurs in the optical diffraction grating with a temperature is slight compared with a change that occurs in a plurality of lenses with a temperature.

In a specific embodiment, a diffraction surface (that is, the third surface) may be represented by using a phase shift function φ(x). The phase shift function φ(x) is designed, so that $\varphi(r)=2\pi/\lambda*(A4r^4+A6r^6+A8r^8\ \ldots)$, where r is a radial distance from a vertex, X is a light wavelength, and A4, A6, and A8 represent aspherical coefficients. Therefore, an optical diffraction grating that meets a requirement of the lens module can be designed by designing the phase shift function.

A focal length change of the diffractive optical element is only a function of coefficients α of thermal expansion of the materials of the lenses (A and B), and is not a function of refractive index changes caused by heating of the materials of the lenses. Proper materials of the lenses and the lens barrel (configured to fasten the imaging lens group) are selected based on unique thermal characteristics of refraction and diffraction lenses. Therefore, a coefficient of thermal expansion of the diffractive optical element is as close as possible to a coefficient of thermal expansion of the lens barrel, so that a change that occurs in a position of an image with a temperature exactly corresponds to a change that occurs in a position of a focal plane (that is, a plane on which an object focal point or an image focal point is perpendicular to the optical axis O) with a temperature, thereby improving a temperature effect of the entire lens module.

Further, the imaging lens group includes, from an object side to an image side, a plurality of lenses whose optical axes O mutually overlap, and a quantity of the plurality of lenses is an integer greater than or equal to 5 and less than or equal to 9. The lens module may include five, six, seven, eight, or nine independent lenses.

The liquid lens is any one of the first three lenses from the object side to the image side along the optical axis. It may be understood that the liquid lens is disposed in a position with a relatively small aperture (for example, disposed as the first lens, the second lens, or the third lens) in the imaging lens group, so that a miniaturization requirement of the lens module can be met. In this embodiment, a single focal length of the liquid lens is greater than 10 mm, and a dispersion coefficient Vd of the liquid lens meets: Vd>100, so that no chromatic aberration is introduced during automatic focus. This embodiment is not limited to a single liquid lens, and may be alternatively applied, through derivation, to a lens system including a plurality of liquid lens, for example, a lens system using a liquid lens array.

The functional optical element may be located in any position in the plurality of lenses. This is not limited herein.

Optionally, from the object side to the image side, the liquid lens is the first lens, the functional optical element is the second lens and/or the third lens, and another lens in the plurality of lenses is the plastic lens. The functional optical element is disposed in the first half of the imaging lens group, so that the functional optical element is closer to the liquid lens than the plastic lens, to help improve a temperature effect by using the functional optical element, thereby improving stability of the lens module.

In a specific embodiment, from the object side to the image side, the liquid lens is the first lens, the functional lens is the second lens, and another lens is the plastic lens. A functional lens with a low refractive index temperature coefficient is selected. Therefore, temperature sensitivity of the entire imaging lens group is reduced, and thermal stability is improved, thereby effectively improving a temperature effect of the imaging lens group.

Alternatively, the liquid lens is the first lens, the diffractive optical element is the third lens, and another lens is the plastic lens. Because the thickness of the optical diffraction grating in the diffractive optical element is very small, the optical diffraction grating is slightly affected by a temperature. Therefore, when the lens module expands after being heated, the diffractive optical element can synchronously expand with the lens barrel, to improve change amounts of an effective focal length and a flange back length with a temperature, so that a change that occurs in a position of an image with a temperature exactly corresponds to a change that occurs in a position of a focal plane with a temperature, thereby improving a temperature effect of the entire lens module.

Certainly, the functional lens and the diffractive optical element may be applied to the plurality of lenses in combination. For example, the liquid lens is the first lens in the plurality of lenses, the functional lens is the second lens in the plurality of lenses, the diffractive optical element is the third lens in the plurality of lenses, and a remaining lens is the plastic lens. The two functional optical elements are applied to the lens module in combination, so that a comprehensive chromatic aberration can be corrected, and also a temperature effect can be improved, thereby dually ensuring imaging stability of the lens module.

In an implementation, the functional lens is a glass lens. To reduce a total weight of the lens module, the glass lens is a thinnest lens in the plurality of lenses.

In an implementation, the functional lens is a glass lens. To consider a position of a center of gravity of the imaging lens group, the glass lens is a lens closest to the center of gravity of the imaging lens group, thereby improving stability of the lens module.

The plurality of lenses have focal power. The focal power is used to represent an incident-light deflection capability of an optical system. A larger absolute value of the focal power indicates a larger deflection capability.

Each lens may have positive focal power or negative focal power. This is not limited herein. When the focal power is a positive value, it indicates that deflection of the optical system for an incident parallel beam parallel to an optical axis is converging. When the focal power is a negative value, it indicates that deflection of the optical system for an incident parallel beam parallel to an optical axis is diverging.

In an implementation, all lenses other than the liquid lens whose focal power can be adjusted in the plurality of lenses have positive focal power. This setting helps adjust an optical path, shorten an optical path length, and implement a larger angle of view while ensuring lens miniaturization.

Further, the imaging lens group further includes an aperture stop. The aperture stop may be disposed between the first lens and the second lens, or may be disposed between the second lens and the third lens. A thickness of the aperture stop is 0.01 to 1 mm, and the aperture stop can effectively improve imaging quality of the lens. It should be noted that the aperture stop may be alternatively disposed in another position. This is not limited herein.

In addition, each lens in the imaging lens group has two surfaces (an object side surface and an image side surface), the surface usually includes a concave surface and/or a convex surface, and one surface of at least one lens in the imaging lens group is designed as an aspherical surface, to reduce projection pattern distortion caused by an aberration or the like. It should be noted that the foregoing limitation of the convex surface and the concave surface is a limitation on each surface in a near-axis area, that is, a limitation in an area near the optical axis O.

The following describes the solution in detail by using several different embodiments.

Comparative Embodiment

Figure 4:
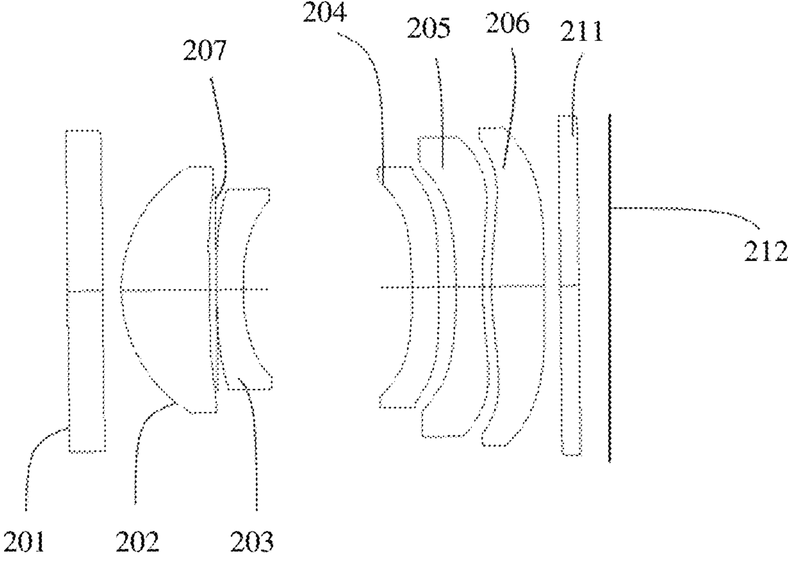
FIG. 4 is a schematic diagram of a structure of a lens module according to an embodiment of this application.

FIG. 4 is a schematic diagram of a structure of a lens module in the comparative embodiment. As shown in FIG. 4, the lens module sequentially includes a first lens 201, a second lens 202, a third lens 203, a fourth lens 204, a fifth lens 205, and a sixth lens 206 from an object side to an image side along an optical axis O. The first lens 201 is a liquid lens, and the second lens 202 to the sixth lens 206 are plastic lenses.

The lens module further includes an aperture stop 207, and the aperture stop 207 is disposed between the second lens 202 and the third lens 203. The lens module further includes a light filter 211 and an image sensor 212. The light lighter 211 is disposed between the sixth lens 206 and the image sensor 212. In this embodiment, a focal length is 9 mm, an aperture is 2.4, a field of view angle is 30°, and an applicable wavelength range of the lens module is a visible spectrum range and is about 620 nm to 450 nm. Table 1A provides specific parameters of the lenses.

TABLE 1A

| Component | Surface | Surface type | Curvature radius | Thickness | Material | Refractive index | Dispersion coefficient |
|---|---|---|---|---|---|---|---|
| Photographed object | S10 | | | | | | |
| First lens | S111 | Aspherical surface | Infinity | 1 | Liquid | 30 | 80 |
| | S112 | Aspherical surface | Infinity to 10 | | | | |
| Second lens | S121 | Aspherical surface | 1.8260 | 1.10 | Plastic | 1.54 | 56 |
| | S122 | Aspherical surface | −74.9310 | 0.09 | | | |
| Aperture stop | S1T0 | Plane | Infinity | 0.08 | | | |
| Third lens | S131 | Aspherical surface | 15.4601 | 0.33 | Plastic | 1.66 | 20.4 |
| | S132 | Aspherical surface | 2.6183 | 2.11 | | | |
| Fourth lens | S141 | Aspherical surface | −7.7677 | 0.33 | Plastic | 1.66 | 20.4 |
| | S142 | Aspherical surface | −26.7174 | 0.22 | | | |
| Fifth lens | S151 | Aspherical surface | −5.8698 | 0.33 | Plastic | 1.54 | 56 |
| | S152 | Aspherical surface | 4.4529 | 0.11 | | | |
| Sixth lens | S161 | Aspherical surface | 3.5139 | 0.66 | Plastic | 1.66 | 20.4 |
| | S162 | | 20.6647 | 0.24 | | | |
| Infrared | S171 | Plane | Infinity | 0.21 | Glass | 1.52 | 64.17 |
| cut-off filter | S172 | Plane | Infinity | 0.4 | | | |
| Image sensor | S181 | Plane | | | | | |

To distinguish between surfaces that are of the lenses and that face the object side and the image side, the surfaces of the plurality of lenses are sequentially numbered from the object side to the image side. For example, a number of an object side surface of the first lens is S111, and a number of an image side surface of the first lens is S112; a number of an object side surface of the second lens is S121, and a number of an image side surface of the second lens is S122; and so on. To achieve a better imaging effect, the aperture stop and the light filter that control a luminous flux are added to the plurality of lenses. In this embodiment, the selected light filter 211 is an infrared cut-off filter, and is a component that can remove an infrared ray from light through filtering. Surfaces corresponding to the aperture stop and the infrared cut-off filter are planar, and curvature radiuses corresponding to the aperture stop and the infrared cut-off filter are infinity, that is, indefinitely large. Surfaces corresponding to the lenses are aspherical, and curvature radiuses corresponding to the lenses are vertex curvature radiuses.

For thicknesses of the plurality of lenses, each lens corresponds to two values, a first value represents a thickness of the lens, a second value represents a distance between a center point of a surface that is of the lens and that faces the image side and a center point of a surface that is of a next lens and that faces the object side, and units of the values are millimeter. For example, for the second lens, a first value is 1.10, indicating that a thickness of the second lens is 1.10 mm, and a second value is 0.09, indicating that a distance between a center point of the surface S22 of the second lens and a center point of the plane ST0 of the aperture stop is 0.09 mm.

For materials of the plurality of lenses, the liquid lens includes a thin film body, that is, is formed by wrapping liquid by using a thin film, the thin film is outside, and the liquid is inside. A curvature radius of an object side surface of the liquid lens is infinity, that is, infinitely large, a curvature radius of an image side surface of the liquid lens is infinity to 10, a thickness of the liquid lens is 1 mm, a refractive index of the liquid lens is 30, and a dispersion coefficient of the liquid lens is 80.

Specifically, aspherical coefficients of the five plastic lenses are shown in Table 1B, where S represents a surface reference sign of each plastic lens, R represents a curvature radius, K represents a cone coefficient, A4 represents a fourth-order aspherical coefficient, A6 represents a sixth-order aspherical coefficient, A8 represents an eighth-order aspherical coefficient, A10 represents a tenth-order aspherical coefficient, A12 represents a twelfth-order aspherical coefficient, and A14 represents a fourteenth-order aspherical coefficient.

TABLE 1B

| Surface | K | A4 | A6 | A8 | A10 | A12 | A14 |
|---|---|---|---|---|---|---|---|
| S121 | 0.00E+00 | 9.70E−03 | −2.70E−02 | 3.26E−02 | −1.96E−02 | 5.88E−03 | −6.76E−04 |
| S122 | 0.00E+00 | −1.82E−02 | 1.67E−01 | −2.10E−01 | 1.28E−01 | −3.96E−02 | 5.02E−03 |
| S131 | 2.07E+01 | 7.74E−03 | 1.42E−01 | −1.74E−01 | 8.18E−02 | −1.21E−02 | −1.06E−03 |
| S132 | −6.69E+01 | 3.32E−01 | −4.84E−01 | 6.81E−01 | −6.04E−01 | 2.96E−01 | −5.54E−02 |
| S141 | 0.00E+00 | −3.87E−02 | −1.14E−01 | 1.95E−01 | −1.98E−01 | 9.34E−02 | −1.59E−02 |
| S142 | 0.00E+00 | −2.59E−02 | −5.96E−02 | 8.36E−02 | −7.74E−02 | 3.16E−02 | −4.27E−03 |
| S151 | 0.00E+00 | −3.59E−03 | 1.73E−02 | −5.06E−02 | 2.26E−02 | −3.51E−03 | 2.42E−04 |

TABLE 1B-continued

| Surface | K | A4 | A6 | A8 | A10 | A12 | A14 |
|---|---|---|---|---|---|---|---|
| S152 | −3.47E+01 | −5.57E−02 | 9.09E−02 | −8.80E−02 | 3.64E−02 | −7.16E−03 | 5.51E−04 |
| S161 | 0.00E+00 | −1.34E−01 | 1.12E−01 | −6.53E−02 | 1.93E−02 | −2.99E−03 | 2.09E−04 |
| S162 | 0.00E+00 | −8.12E−02 | 4.36E−02 | −2.10E−02 | 6.45E−03 | −1.21E−03 | 1.01E−04 |

To test changes that occur in an effective focal length (Effective Focal Length, EFL) and a flange back length (Flange Back Length, FBL) because the lens module changes with a temperature, change amounts of the effective focal length and the flange back length are separately measured when the imaging lens is at ambient temperatures of −30° C., −20° C., −10° C., 01, 100, 200, 300, 40° C., and 50° C., and a result is shown in Table 1C.

TABLE 1C

| T (° C.) | EFL (mm) | FBL (mm) | Δ EFL (μm) | Δ FBL (μm) |
|---|---|---|---|---|
| −30 | 9.079 | 0.774 | −121 | −76 |
| −20 | 9.103 | 0.789 | −97 | −61 |
| −10 | 9.127 | 0.805 | −73 | −45 |
| 0 | 9.151 | 0.820 | −49 | −30 |
| 10 | 9.176 | 0.835 | −24 | −15 |
| 20 | 9.200 | 0.850 | 0 | 0 |
| 30 | 9.225 | 0.866 | 25 | 16 |
| 40 | 9.250 | 0.882 | 50 | 32 |
| 50 | 9.277 | 0.899 | 77 | 49 |

Specific Embodiment 1

Figure 5:
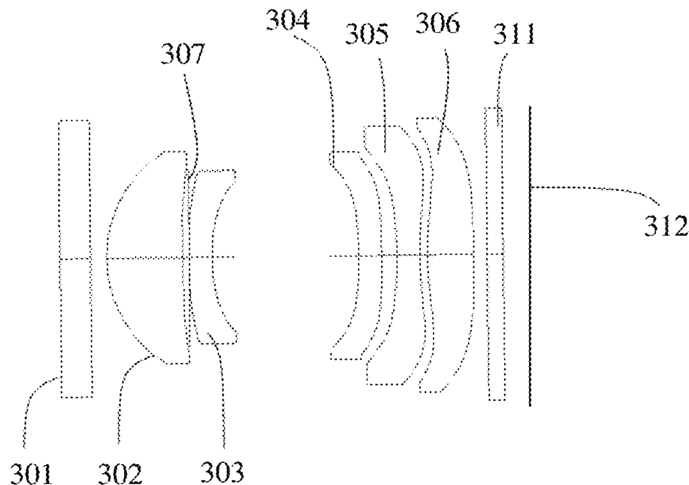
FIG. 5 is a schematic diagram of a structure of another lens module according to an embodiment of this application.

FIG. 5 is a schematic diagram of a structure of a lens module in the specific embodiment 1. As shown in FIG. 5, the lens module sequentially includes a first lens 301, a second lens 302, a third lens 303, a fourth lens 304, a fifth lens 305, and a sixth lens 306 from an object side to an image side along an optical axis O. The first lens 301 is a liquid lens, the second lens 302 is a glass lens, and the third lens 303 to the sixth lens 306 are plastic lenses.

The lens module further includes an aperture stop 307, and the aperture stop 307 is disposed between the second lens 302 and the third lens 303. In this embodiment, a specification of the aperture stop 307 is the same as that in the comparative embodiment, the lens module further includes a light lighter 311 and an image sensor 312, and the light lighter 311 is disposed between the sixth lens 306 and the image sensor 312. A focal length, an aperture, a field of view angle, and an applicable wavelength range of the lens module are the same as those in the comparative embodiment. Table 2A provides specific parameters of the lenses.

TABLE 2A

| Component | Surface | Surface type | Curvature radius | Thickness | Material | Refractive index | Dispersion coefficient |
|---|---|---|---|---|---|---|---|
| Photographed object | S20 | | | | | | |
| First lens | S211 | Aspherical surface | Infinity | 1 | Liquid | 30 | 80 |
| | S212 | Aspherical surface | Infinity to 10 | | | | |
| Second lens | S221 | Aspherical surface | 1.8890 | 1.03 | Glass | 1.75 | 27.7 |
| | S222 | Aspherical surface | 99.8420 | 0.03 | | | |
| Aperture stop | S2T0 | Plane | Infinity | 0.08 | | | |
| Third lens | S231 | Aspherical surface | 37.4095 | 0.30 | Plastic | 1.66 | 20.4 |
| | S232 | Aspherical surface | 2.2012 | 1.93 | | | |
| Fourth lens | S241 | Aspherical surface | −2.1192 | 0.62 | Plastic | 1.66 | 20.4 |
| | S242 | Aspherical surface | −131.8971 | 0.12 | | | |
| Fifth lens | S251 | Aspherical surface | −7.6335 | 0.55 | Plastic | 1.54 | 56 |
| | S252 | Aspherical surface | 3.7366 | 0.08 | | | |
| Sixth lens | S261 | Aspherical surface | 3.2935 | 0.88 | Plastic | 1.66 | 20.4 |
| | S262 | | −26.6987 | 0.24 | | | |
| Infrared | S271 | Plane | Infinity | 0.21 | Glass | 1.52 | 64.17 |
| cut-off filter | S272 | Plane | Infinity | 0.4 | | | |
| Image sensor | S281 | Plane | | | | | |

For meanings of the parameters in Table 2A, refer to the related descriptions of Table 1A. Details are not described herein again.

TABLE 2B

| Sequence number | K | A4 | A6 | A8 | A10 | A12 | A14 |
|---|---|---|---|---|---|---|---|
| S221 | 0.00E+00 | 7.43E−03 | −2.64E−02 | 3.31E−02 | −1.96E−02 | 5.87E−03 | −7.05E−04 |
| S222 | 0.00E+00 | −1.78E−02 | 1.65E−01 | −2.11E−01 | 1.28E−01 | −3.96E−02 | 5.10E−03 |
| S231 | 2.07E+01 | 5.17E−03 | 1.42E−01 | −1.73E−01 | 8.20E−02 | −1.22E−02 | −1.02E−03 |
| S232 | −6.69E+01 | 3.47E−01 | −4.79E−01 | 6.81E−01 | −6.00E−01 | 2.99E−01 | −5.28E−02 |
| S241 | 0.00E+00 | −4.26E−02 | −8.41E−02 | 1.92E−01 | −2.03E−01 | 9.00E−02 | −1.30E−02 |
| S242 | 0.00E+00 | −1.44E−02 | −6.20E−02 | 8.65E−02 | −7.61E−02 | 3.21E−02 | −5.17E−03 |
| S251 | 0.00E+00 | −2.37E−02 | 2.22E−03 | −5.18E−02 | 2.60E−02 | −3.01E−03 | 1.83E−05 |
| S252 | −3.47E+01 | −6.17E−02 | 9.66E−02 | −8.75E−02 | 3.65E−02 | −7.16E−03 | 5.48E−04 |
| S261 | 0.00E+00 | −1.34E−01 | 1.10E−01 | −6.50E−02 | 1.94E−02 | −2.97E−03 | 2.15E−04 |
| S262 | 0.00E+00 | −8.82E−02 | 4.37E−02 | −2.14E−02 | 6.36E−03 | −1.20E−03 | 1.03E−04 |

For meanings of the parameters in Table 2B, refer to the related descriptions of Table 1B. Details are not described herein again.

To test changes that occur in an effective focal length (Effective Focal Length, EFL) and a flange back length (Flange Back Length, FBL) because the lens module changes with a temperature, change amounts of the effective focal length and the flange back length are separately measured when the lens module is at ambient temperatures of −30° C., −20° C., −10° C., 01, 100, 200, 300, 40° C., and 50° C., and a result is shown in Table 2C.

TABLE 2C

| T (° C.) | EFL (mm) | FBL (mm) | Δ EFL (μm) | ΔFBL (μm) |
|---|---|---|---|---|
| −30 | 9.183 | 0.838 | −17 | −12 |
| −20 | 9.187 | 0.841 | −13 | −9 |
| −10 | 9.190 | 0.843 | −10 | −7 |
| 0 | 9.194 | 0.846 | −6 | −4 |
| 10 | 9.197 | 0.848 | −3 | −2 |
| 20 | 9.200 | 0.850 | 0 | 0 |
| 30 | 9.203 | 0.852 | 3 | 2 |
| 40 | 9.206 | 0.854 | 6 | 4 |
| 50 | 9.210 | 0.857 | 10 | 7 |

It can be learned from Table 1C and Table 2C that the change amounts of the effective focal length and the flange back length with a temperature can be improved in both a low temperature state and a high temperature state by using a glass-plastic combination design. Compared with a combination design of the liquid lens and the plastic lens, the liquid lens and the glass-plastic combination design can reduce the change amounts of the effective focal length and the flange back length with a temperature by 7 to 10 times. An imaging lens group in the specific embodiment 1 can effectively improve a temperature effect of the imaging lens group while ensuring lens miniaturization.

Specific Embodiment 2

Figure 6:
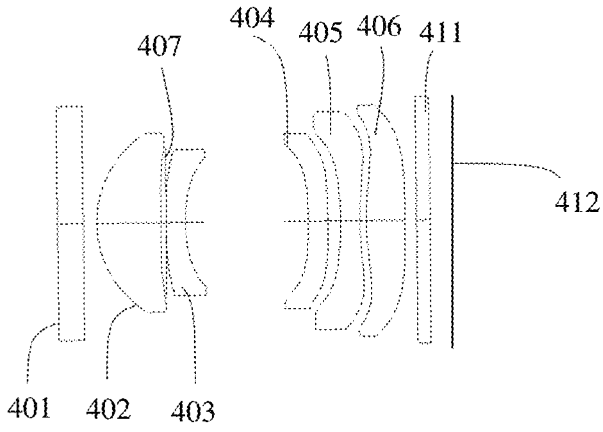
FIG. 6 is a schematic diagram of a structure of another lens module according to an embodiment of this application.

FIG. 6 is a schematic diagram of a structure of a lens module in the specific embodiment 1. As shown in FIG. 6, the lens module sequentially includes a first lens 401, a second lens 402, a third lens 403, a fourth lens 404, a fifth lens 405, and a sixth lens 406 from an object side to an image side along an optical axis O. The first lens 401 is a liquid lens, the second lens 402, the fourth lens 404, the fifth lens 405, and the sixth lens 406 are plastic lenses, and the third lens 403 is a diffractive optical element, that is, the third lens 403 includes two lenses (A and B) and an optical diffraction grating sandwiched between the lens A and the lens B.

The lens module further includes an aperture stop 408, and the aperture stop 408 is disposed between the second lens 402 and the third lens 403. The lens module further includes a light filter 411 and an image sensor 412. The light lighter 411 is disposed between a seventh lens 407 and the image sensor 412. A focal length, an aperture, a field of view angle, and an applicable wavelength range of the lens module are also the same as those in the comparative embodiment. Table 3A provides specific parameters of the lenses.

TABLE 3A

| Component | | Surface | Surface type | Curvature radius | Thickness | Material | Refractive index | Dispersion coefficient |
|---|---|---|---|---|---|---|---|---|
| Photographed object | | S30 | | | | | | |
| First lens | | S311 | Aspherical surface | Infinity | 1 | Liquid | 30 | 80 |
| | | S312 | Aspherical surface | Infinity to 10 | | | | |
| Second lens | | S321 | Aspherical surface | 2.0086 | 1.21 | Plastic | 1.54 | 56 |
| | | S322 | Aspherical surface | −82.4130 | 0.10 | | | |
| Aperture stop | | S3T0 | Plane | Infinity | 0.08 | | | |
| Third lens | Lens A | S331 | Aspherical surface | 17.0056 | 0.18 | Plastic | 1.66 | 20.4 |
| | | S332 | Diffraction surface | 1.8088 | 0.18 | | | |

TABLE 3A-continued

| Component | Surface | Surface type | Curvature radius | Thickness | Material | Refractive index | Dispersion coefficient |
|---|---|---|---|---|---|---|---|
| Lens B | S333 | Aspherical surface | 2.8803 | 2.32 | Plastic | | |
| Fourth lens | S341 | Aspherical surface | −8.5443 | 0.36 | Plastic | 1.66 | 20.4 |
| | S342 | Aspherical surface | −29.3945 | 0.24 | | | |
| Fifth lens | S351 | Aspherical surface | −6.4571 | 0.36 | Plastic | 1.54 | 56 |
| | S352 | Aspherical surface | 4.8977 | 0.12 | | | |
| Sixth lens | S361 | Aspherical surface | 3.8656 | 0.73 | Plastic | 1.66 | 20.4 |
| | S362 | Aspherical surface | 22.7063 | 0.24 | | | |
| Light filter | S371 | Plane | Infinity | 0.21 | Glass | 1.52 | 64.17 |
| | S372 | Plane | Infinity | 0.4 | | | |
| Image sensor | S381 | Plane | | | | | |

For meanings of the parameters in Table 3A, refer to the related descriptions of Table 1A. Details are not described herein again.

TABLE 3B

| Sequence number | K | A4 | A6 | A8 | A10 | A12 | A14 |
|---|---|---|---|---|---|---|---|
| S321 | 0.00E+00 | 7.29E−03 | −1.68E−02 | 1.67E−02 | −8.33E−03 | 2.06E−03 | −1.96E−04 |
| S322 | 0.00E+00 | −1.37E−02 | 1.03E−01 | −1.08E−01 | 5.42E−02 | −1.39E−02 | 1.45E−03 |
| S331 | 2.07E+01 | 5.81E−03 | 8.79E−02 | −8.92E−02 | 3.47E−02 | −4.26E−03 | −3.08E−04 |
| S332 | −9.710E+04 | −4.58E−02 | 0.00E+00 | 0.00E+00 | 0.00E+00 | 0.00E+00 | 0.00E+00 |
| S333 | −9.72E−04 | 2.49E−01 | −3.00E−01 | 3.49E−01 | −2.56E−01 | 1.04E−01 | −1.60E−02 |
| S341 | 0.00E+00 | −2.91E−02 | −7.10E−02 | 1.00E−01 | −8.38E−02 | 3.27E−02 | −4.61E−03 |
| S342 | 0.00E+00 | −1.95E−02 | −3.70E−02 | 4.29E−02 | −3.28E−02 | 1.11E−02 | −1.24E−03 |
| S351 | 0.00E+00 | −2.69E−03 | 1.07E−02 | −2.59E−02 | 9.57E−03 | −1.23E−03 | 7.00E−05 |
| S352 | −3.47E+01 | −4.19E−02 | 5.64E−02 | −4.52E−02 | 1.54E−02 | −2.51E−03 | 1.60E−04 |
| S361 | 0.00E+00 | −1.01E−01 | 6.94E−02 | −3.35E−02 | 8.17E−03 | −1.05E−03 | 6.05E−05 |
| S362 | 0.00E+00 | −6.10E−02 | 2.71E−02 | −1.08E−02 | 2.74E−03 | −4.25E−04 | 2.92E−05 |

For meanings of the parameters in Table 3B, refer to the related descriptions of Table 1B. Details are not described herein again.

To test changes that occur in an effective focal length (Effective Focal Length, EFL) and a flange back length (Flange Back Length, FBL) because the lens module changes with a temperature, change amounts of the effective focal length and the flange back length are separately measured when the lens module is at ambient temperatures of −30° C., −20° C., −10° C., 01, 100, 200, 300, 40° C., and 50° C., and a result is shown in Table 3C.

TABLE 3C

| T (° C.) | EFL (mm) | FBL (mm) | Δ EFL (μm) | Δ FBL (μm) |
|---|---|---|---|---|
| −30 | 9.181 | 0.835 | −19 | −15 |
| −20 | 9.186 | 0.840 | −14 | −10 |
| −10 | 9.191 | 0.843 | −9 | −7 |
| 0 | 9.192 | 0.843 | −8 | −7 |
| 10 | 9.197 | 0.848 | −3 | −2 |
| 20 | 9.200 | 0.850 | 0 | 0 |
| 30 | 9.204 | 0.853 | 4 | 3 |
| 40 | 9.208 | 0.855 | 8 | 5 |
| 50 | 9.213 | 0.859 | 13 | 9 |

It can be learned from Table 1C and Table 3C that, in a refraction-diffraction combination design, because a thickness of the optical diffraction grating in the diffractive optical element is very small, the optical diffraction grating is slightly affected by a temperature. Therefore, after the lens module expands after being heated, change amounts of the effective focal length and the flange back length with a temperature can be improved. Compared with a combination design of the liquid lens and the plastic lens, the refraction-diffraction combination design can be used to reduce the change amounts of the effective focal length and the flange back length with a temperature by 7 to 10 times. The lens module in the specific embodiment 2 can effectively improve a temperature effect of the lens module while ensuring lens miniaturization.

The foregoing descriptions are merely preferred specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A lens apparatus, comprising:

an imaging lens group;

a light filter; and an image sensor; and wherein the light filter is disposed between the imaging lens group and the image sensor, the imaging lens group comprises a plurality of lenses whose optical axes mutually overlap, the plurality of lenses comprise a liquid lens, a plastic lens, and a functional optical element, the functional optical element comprises a functional lens, and a refractive index temperature coefficient β of the functional lens meets: $-9\times10^{-5}\leq\beta\leq9\times10^{-5}$;

wherein the functional lens is a glass lens, and the glass lens is a lens closest to a center of gravity of the imaging lens group;

wherein the imaging lens group further comprises an aperture stop next to the liquid lens; and wherein the liquid lens comprises a thin film body in which liquid is encapsulated, a pressing element, and an actuator, and wherein the actuator is configured to push the pressing element to press the thin film body, causing the pressing element to change a surface shape of the thin film body.

2. The lens apparatus according to claim 1, wherein the liquid lens is any one of first three lenses in a direction from an object side to an image side along the mutually overlapped optical axes.

3. The lens apparatus according to claim 2, wherein in the direction from the object side to the image side along the mutually overlapped optical axes, the liquid lens is a first lens, the functional optical element is a second lens or a third lens, and another lens in the plurality of lenses is the plastic lens.

4. The lens apparatus according to claim 3, wherein the functional optical element further comprises a diffractive optical element, and in the direction from the object side to the image side along the mutually overlapped optical axes, the functional lens is the second lens, and the diffractive optical element is the third lens.

5. The lens apparatus according to claim 1, wherein the glass lens is a thinnest lens in the plurality of lenses.

6. The lens apparatus according to claim 1, wherein an object side surface or an image side surface of the functional lens is an aspherical surface.

7. The lens apparatus according to claim 1, wherein the functional optical element further comprises a diffractive optical element, the diffractive optical element comprises a first lens, a second lens, and an optical diffraction grating located between the first lens and the second lens, both the first lens and the second lens of the diffractive optical element are plastic lenses, and a thickness of the optical diffraction grating is 0 to 60 μm.

8. The lens apparatus according to claim 1, wherein the functional optical element further comprises a diffractive optical element, and an object side surface or an image side surface of the diffractive optical element is an aspherical surface.

9. The lens apparatus according to claim 1, wherein a dispersion coefficient Vd1 of the functional lens meets: $15\leq Vd1\leq100$, and a dispersion coefficient Vd2 of the liquid lens meets: $Vd2>100$.

10. An electronic device, comprising:

a processor; and a lens apparatus, comprising:

an imaging lens group, a light filter, and an image sensor, wherein the light filter is disposed between the imaging lens group and the image sensor, the imaging lens group comprises a plurality of lenses whose optical axes mutually overlap, the plurality of lenses comprise a liquid lens, a plastic lens, and a functional optical element, the functional optical element comprises a functional lens, and a refractive index temperature coefficient β of the functional lens meets: $-9\times10^{-5}\leq\beta\leq9\times10^{-5}$; and wherein the functional lens is a glass lens, and the glass lens is a lens closest to a center of gravity of the imaging lens group;

wherein the imaging lens group further comprises an aperture stop next to the liquid lens; and wherein the liquid lens comprises a thin film body in which liquid is encapsulated, a pressing element, and an actuator, and wherein the actuator is configured to push the pressing element under control of the processor to press the thin film body, causing the pressing element to change a surface shape of the thin film body.

11. The electronic device according to claim 10, wherein the liquid lens is any one of first three lenses in a direction from an object side to an image side along the mutually overlapped optical axes.

12. The electronic device according to claim 11, wherein in the direction from the object side to the image side along the mutually overlapped optical axes, the liquid lens is a first lens, the functional optical element is a second lens or a third lens, and another lens in the plurality of lenses is the plastic lens.

13. The electronic device according to claim 12, wherein the functional optical element further comprises a diffractive optical element, and in the direction from the object side to the image side along the mutually overlapped optical axes, the functional lens is the second lens, and the diffractive optical element is the third lens.

14. The electronic device according to claim 10, wherein the glass lens is a thinnest lens in the plurality of lenses.

15. The electronic device according to claim 10, wherein an object side surface or an image side surface of the functional lens is an aspherical surface.

16. The electronic device according to claim 10, wherein the functional optical element further comprises a diffractive optical element, the diffractive optical element comprises a first lens, a second lens, and an optical diffraction grating located between the first lens and the second lens, both the first lens and the second lens of the diffractive optical element are plastic lenses, and a thickness of the optical diffraction grating is 0 to 60 μm.

17. The electronic device according to claim 10, wherein the functional optical element further comprises a diffractive optical element, and an object side surface or an image side surface of the diffractive optical element is an aspherical surface.

18. The electronic device according to claim 10, wherein a dispersion coefficient Vd1 of the functional lens meets: $15\leq Vd1\leq100$, and a dispersion coefficient Vd2 of the liquid lens meets: $Vd2>100$.

19. An electronic device, comprising:

a processor; and a lens apparatus, comprising:

an imaging lens group, a light filter, and an image sensor, wherein the light filter is disposed between the imaging lens group and the image sensor, the imaging lens group comprises a plurality of lenses whose optical axes mutually overlap, the plurality of lenses comprise a liquid lens, a plastic lens, and a functional optical element, the functional optical element comprises a functional lens, and a refractive index temperature coefficient β of the functional lens meets: $-9\times10^{-5}\leq\beta\leq9\times10^{-5}$; and wherein the functional lens is a glass lens, and the glass lens is a lens closest to a center of gravity of the imaging lens group;

wherein the imaging lens group further comprises an aperture stop next to the liquid lens; and wherein the liquid lens comprises a thin film body in which liquid is encapsulated, a pressing element, and an actuator, and wherein the actuator is configured to push the pressing element under control of the processor to press the thin film body, causing the pressing element to change a surface shape of the thin film body;

wherein the glass lens is a thinnest lens in the plurality of lenses; and wherein an object side surface or an image side surface of the functional lens is an aspherical surface.

20. The electronic device according to claim 19, wherein the functional optical element further comprises a diffractive optical element.

* * * * *